June 12, 1962   C. VAN DER LELY ET AL   3,038,292
RAKING, SWEEPING, WEEDING OR LIKE WHEELS
Filed Oct. 2, 1958   2 Sheets-Sheet 2
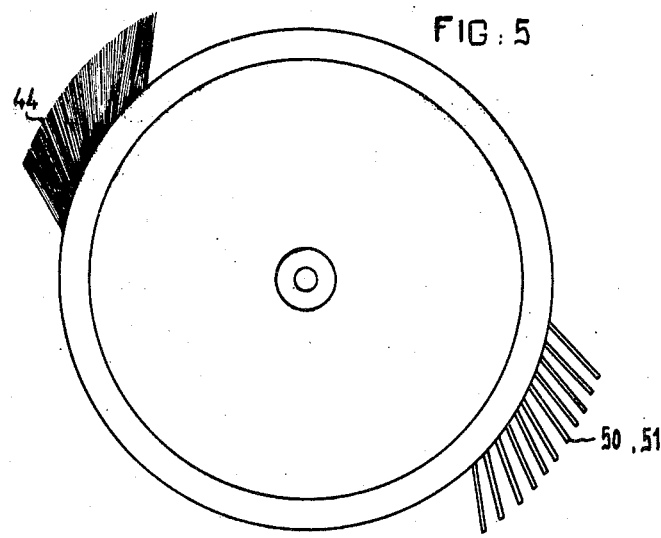
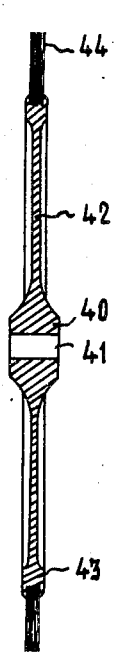
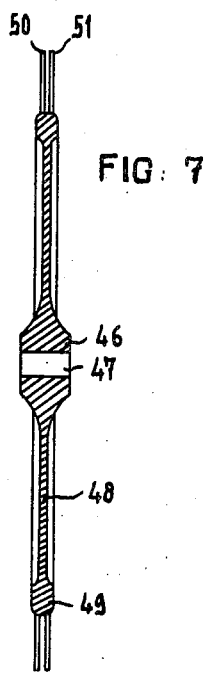

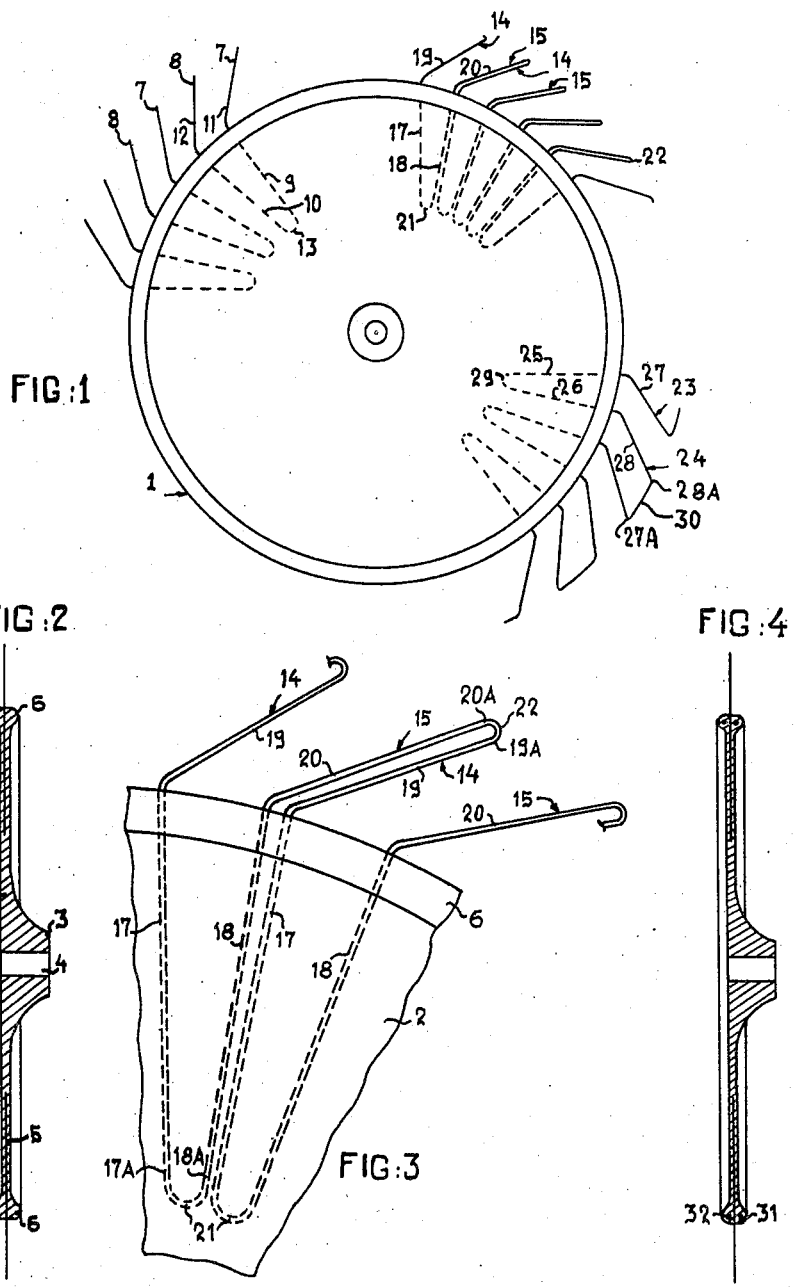

United States Patent Office 3,038,292
Patented June 12, 1962

3,038,292
RAKING, SWEEPING, WEEDING OR
LIKE WHEELS
Cornelis van der Lely and Ary van der Lely, Maasland,
Netherlands, assignors to C. van der Lely N.V., Maasland, Netherlands, a Dutch limited company
Filed Oct. 2, 1958, Ser. No. 764,820
Claims priority, application Netherlands Oct. 22, 1957
15 Claims. (Cl. 56—377)

This invention relates to raking, sweeping, weeding or like wheels of the kind in which the wheel body carries peripherally a plurality of tine-shaped fingers, teeth, bristles or the like which are adapted to be brought into contact with the ground or other surface whilst the wheel is rotating for the purpose of displacing material lying thereon. The tine-shaped fingers or teetth may also be such as to dig into the ground for the purpose of weeding. Hereinafter the tine-shaped fingers or their prolongations, teeth or their prolongations, bristles or the like will for brevity be referred to simply as "fingers."

Wheels of the kind just set forth are generally known, and the construction of the wheels is such that for manufacture the assembly of various parts requires manual operations, which are time-consuming and costly. The invention has for its object to provide a wheel of the aforesaid kind, which can be manufactured almost completely with the aid of machines, so that the manufacture is cheaper and quicker. In accordance with the invention there is provided a wheel of the kind set forth, wherein the fingers (as hereinbefore defined) have portions which are embedded or rooted in organic or inorganic material forming a part of the wheel body or material applied to said part. In referring to the embedding of a portion of a finger, it is to be understood that this includes the case where the portion of the finger may not necessarily be surrounded throughout its entire superficial area. Moreover such portion is also to be considered as embedded if a part of such portion nearer the periphery of the wheel body and enclosed thereby is not in fact gripped in said material. Assuming, of course, that the ungripped part is substantially straight, it will be appreciated that the finger may be subjected to torsional deflections about the longitudinal axis of the ungripped part. This can be of considerable advantage where the wheel is employed as a rake wheel and the fingers are made as the tines of a rake wheel.

A simple construction of wheel in accordance with the invention, has adjacent fingers interconnected at the location where they are embedded, thereby ensuring that the fingers are anchored in the wheel.

For a better understanding of the invention, reference will now be made to the accompanying drawings in which:

FIGURE 1 is a front elevation of a wheel, three different kinds of fingers being illustrated, FIGURE 2 is a central sectional view of the wheel shown in FIGURE 1, FIGURE 3 is a view to an enlarged scale of part of the wheel shown in FIGURE 1, FIGURE 4 is a view similar to FIGURE 2 but showing a modification, FIGURE 5 is a front elevation of a second embodiment of a wheel according to the invention, two different kinds of fingers being illustrated, and FIGURES 6 and 7 are central sectional views of the wheel shown in FIGURE 5.

Referring first to FIGURES 1, 2 and 3 of the drawings, the wheel 1 has a wheel body 2 formed with a hub 3 having a hole 4 therein for the reception of a shaft about which the wheel may rotate. The portion 5 of the wheel is flat, save for a thickened rim 6 which serves to stiffen the edge. The wheel has peripheral fingers. FIGURE 1 illustrates three possible alternative types of peripheral fingers. In the left-hand upper part of FIGURE 1, tines comprising fingers 7 and 8 are shown having respectively inner portions 9 and 10 embedded in the peripheral part 5 of the wheel body. Outer portions 11 and 12 of each of the fingers 7 and 8 extending outside the wheel body, are inclined to the portions 9 and 10 embedded in the wheel body. The length of each embedded portion is substantially equal to one-and-a-half times the length of the remaining unembedded portion of a finger. Adjacent fingers 7 and 8 are integrally connected by a bent portion 13. The straight portions 9 and 10 although embedded in the wheel body, are not gripped by the material thereof so that they are free to turn about their longitudinal axes. Although the portions 9 and 10 are not gripped, the bent portion 13 interconnecting them will ensure that the fingers are anchored in the wheel. When the portions 11 and 12 of the fingers 7 and 8 are deflected in a direction perpendicular to the wheel plane, the radially outer ends of the portions 9 and 10 will turn about their longitudinal axes, but the bent portion 13 will prevent turning of the radially inner ends of the portions 9 and 10. Hence the portions 9 and 10 will experience torsional deflections and will correspondingly oppose in a resilient fashion the deflection of the portions 11 and 12.

In the right-hand upper half of FIGURE 1, fingers are shown each of which is composed of two parts 14 and 15. The parts 14 and 15 each have portions 19 and 20 extending beyond the peripheral part of the wheel, the radially outer ends 19A and 20A being interconnected by a bent portion 22. Each of the parts 14 and 15 of a finger has straight embedded portions 17 and 18, the radially inner ends 17A and 18A of which are connected to the corresponding portions of adjacent fingers by bent portions 21. As in the case of the fingers 7 and 8, the composite fingers having the parts 14 and 15 are inclined where they emerge from the body of the wheel. In the same manner, the bent portions 21 serve as anchorages for the fingers 14, 15. The space between the portions 19 and 20 of a composite finger is of the order of the thickness of the material constituting the finger. The space between adjacent fingers at the periphery of the wheel body is greater than the thickness of the material composing the fingers and should be at least twice the thickness.

In the right-hand lower half of FIGURE 1 fingers 23 and 24 are shown. Such fingers have embedded portions 25 and 26 respectively and portions 27 and 28 respectively extending beyond the periphery of the wheel body. The portions 27 and 28 are inclined to the portions 25 and 26, the latter being interconnected by a bent portion 29 at their radially inner ends. At the radially outer ends of the portions 27 and 28 they are connected at 27A and 28A by portions 30. Hence the fingers are composed of a continuous piece of material of sinuous form, the spacing between the fingers connected by the portions 30 being equal to the spacing of the corresponding portions of the fingers not so connected. By removal of the portions 30 it will be appreciated that the fingers 23 and 24 will appear like the fingers 7 and 8 previously described.

The radially outer ends of the fingers 23 and 24 and the composite fingers 14 and 15, may be deflected in a direction at right angles to the plane of the wheel body. The embedded portions of the fingers will thereby be torsionally stressed in the same way as described in connection with the fingers 7 and 8. Again the bent portions 21 and 29 will serve as anchorages.

The manufacture of the three forms of wheel indicated in FIGURES 1 to 3 involves but little manual work. The fingers can thus be made almost completely with the aid of machinery. During the formation of the wheel bodies, the fingers are embedded therein. The wheel body may be composed of thermo-setting, thermo-plastic, ceramic or other material which can be readily cast or compression- or injection-moulded. The fingers may, as in the case of the fingers 7 and 8 be formed in pairs from a single piece of material, the pairs being arranged appropriately so as to be embedded during the formation of the wheel body. Alternatively the fingers may all be formed from the one piece of material as in the case of the fingers 14, 15 and 23 and 24. The relative position of the fingers during their embedding in the wheel body is then pre-determined. The interconnecting portions 30 in the case of the fingers 23 and 24 may be removed from the formed wheel with the aid of a press. It will not usually be necessary to remove the end portions 22 of the composite fingers 14, 15, but if so desired they may be similarly removed.

The nature of the material employed for the wheel body 2 is determined in accordance with the purpose of use for the wheel. If the wheel is to be capable of deflecting resiliently, correspondingly the material is chosen having an appropriate character. In the same way, if the wheel has to be such as to resist deflection, the material is chosen to ensure the desired degree of rigidity. The wheel is stiffened by the provision of the rim 6, and if it is desired to strengthen the rim, reinforcing rings 31 and 32 may be placed therein as indicated in FIGURE 4. These rings, which to be effective will be composed of material different from that composing the body of the wheel, are incorporated in the latter during the formation thereof.

In the constructions so far described, the fingers have portions which are completely enclosed in the material in which they are embedded.

As shown in FIGURES 5 and 6, a wheel is formed with a hub 40 having a hole 41 for the introduction of a shaft about which the wheel may rotate. A peripheral annular part 42 is connected with the hub 40, and has a rim 43. As appears from the top left-hand corner of FIGURE 5, the rim 43 has fingers 44 extending therefrom. The fingers in this case are formed as hairs or bristles so that the wheel constitutes a rotary brush. The bristles are embedded in the rim 43 over approximately one-sixth of their length. If the wheel body is made from thermo-plastic, thermo-setting or other materials, the bristles can be embedded in the rim portion 43 during the formation of the wheel body.

It will be noted that in the construction of FIGURES 5 and 6 several fingers in the form of bristles are located across the width of the edge of the wheel as distinct from the previously described construction in which only one finger was centrally positioned across the width of the edge of the wheel. In all the constructions so far described, the fingers and the part of the wheel body in which they have been embedded are made of different kinds of material. In the case of the embodiment shown in FIGURES 5 and 7 (the bottom right-hand corner of FIGURE 5), the fingers and the wheel body are composed of the same material. The wheel body has a hub 46 with a hole 47 therein. Integral with the hub there is an annular flat part 48 having a thickened rim 49. Fingers 50 and 51 in the form of teeth are located in two rows around the rim 49. In the manufacture of this wheel, the whole wheel body and the fingers are made simultaneously from the same material in a mould or the like.

The various wheels described above may be provided with particular kinds of fingers depending upon the intended purpose for the wheel. If the wheels are to be used for gathering crops lying on the ground, it will be advantageous for the wheel to have fingers such as shown in FIGURES 1 to 4, the flexibility of these fingers being chosen in accordance with the kind of crop to be gathered. For harvesting hay, grass or dried clover it will, for example, be advantageous to have very flexible fingers. If on the other hand a wheel is to be used for weeding it may well be desirable to have fingers which are less flexible so that they can pull the weeds from the ground. If a wheel is to be employed, however, for sweeping up rubbish it will be best to employ fingers such as shown in FIGURES 5 to 7. The wheels according to the invention are also particularly suitable for use with lawn rakes and similar small implements.

What we claim is:

1. A wheel including a body for raking, weeding or feeding material, said body having a central shaft receiving aperture, said wheel having a plurality of tines extending around the periphery thereof and adapted to engage the ground for displacing material lying thereon as the wheel is rotated, said tines having substantially straight supporting portions extending away from said aperture and embedded in said wheel body in such a manner that said supporting portions are substantially embraced along their entire length and circumference and an inclined portion connecting each supporting portion to its tine.

2. A wheel as claimed in claim 1 wherein each tine extends from its bent portion at an angle to its supporting portion.

3. A wheel as claimed in claim 1 wherein the length of a supporting portion is about one and one-half times the length of its tine.

4. A wheel as claimed in claim 1 wherein said tines and supporting members are composed of a continuous piece of material in sinuous form.

5. A rake wheel comprising a plurality of resilient fingers and a wheel body, said fingers having a substantially straight inner portion and an outer portion, said inner portions being embraced along their entire length and circumference within said wheel body and anchored therein, said outer portions extending substantially at an acute angle to the periphery of said wheel body.

6. A rake wheel according to claim 5 wherein adjacent fingers are connected at the innermost aspects of said inner portions.

7. A rake wheel according to claim 5 wherein said wheel body is a casting and said fingers are embedded in said wheel body when it is cast.

8. A rake wheel according to claim 5 wherein more than two fingers are integral with one another, the radially more distant ends of two fingers being connected with each other, whilst the other ends of these fingers are connected with the ends of further fingers, which are also embraced along their entire peripheral surface in the material.

9. A rake wheel according to claim 8 wherein the two fingers of which the radially more distant ends are interconnected, are spaced apart from each other by a distance which is approximately equal to the thickness of one finger, whilst the fingers of which the ends are embraced in the material are interconnected and spaced apart from one another by a distance which is more than twice the thickness of one finger.

10. A rake wheel according to claim 5 wherein the material in which the fingers are embraced is formed at the circumference of the wheel with a stiffening rim.

11. A rake wheel according to claim 10 wherein the stiffening rim is provided with a reinforcement of a kind of material differing from that in which the fingers are embraced.

12. A wheel as claimed in claim 1 wherein said wheel is provided with a rim about its periphery and spaced apertures in said rim, said tines extending through said apertures.

13. A rake wheel which comprises a relatively flat one piece cylindrical body member, a plurality of substantially radially extending embedded members in said body member, a bent portion joining together the inner ends of each two adjacent embedded members, a plurality of crop engaging tines circumferentially spaced about the periphery of said body member, each of said tines connecting to the outer end of one of said embedded portions.

14. A rake wheel which comprises a substantially uniplanar cylindrical body, a plurality of substantially radially extending embedded members embraced within said body, a bent portion joining the inner ends of two of said embedded members, a plurality of crop engaging tines circumferentially spaced about the periphery of said body, each of said tines connected to the outermost end of one of said embedded portions.

15. A rake wheel which comprises a substantially uniplanar cylindrical body, a plurality of substantially radially extending embedded members movably embraced within said body, a bent portion joining the inner ends of two of said embedded members, a plurality of crop engaging tines circumferentially spaced about the periphery of said body, each of said tines, connected to the outermost end of said embedded portions and extending outwardly at an angle thereto.

References Cited in the file of this patent

UNITED STATES PATENTS

| | | |
|---|---|---|
| 1,326,815 | Wheeler | Dec. 30, 1919 |
| 2,645,804 | Gantz et al. | July 21, 1953 |
| 2,739,332 | Flohr | Mar. 27, 1956 |
| 2,909,888 | van der Lely | Oct. 27, 1959 |

FOREIGN PATENTS

| | | |
|---|---|---|
| 480,889 | Italy | May 13, 1953 |
| 1,113,379 | France | Dec. 5, 1955 |